United States Patent
Hsu et al.

(10) Patent No.: US 7,082,385 B2
(45) Date of Patent: Jul. 25, 2006

(54) METHOD FOR VERIFYING OPTIMIZATION OF PROCESSOR LINK

(75) Inventors: Ming-Wei Hsu, Taipei (TW); Sheng-Chang Peng, Taipei (TW)

(73) Assignee: Via Technologies, Inc., Taipei (TW)

( * ) Notice: Subject to any disclaimer, the term of this patent is extended or adjusted under 35 U.S.C. 154(b) by 7 days.

(21) Appl. No.: 10/825,239

(22) Filed: Apr. 16, 2004

(65) Prior Publication Data
US 2005/0119860 A1 Jun. 2, 2005

(30) Foreign Application Priority Data
Nov. 27, 2003 (TW) .............................. 921133297 A

(51) Int. Cl.
*G06F 15/00* (2006.01)

(52) U.S. Cl. .................................................. 702/186

(58) Field of Classification Search ................ 702/108, 702/109, 119, 122, 126, 182, 186, 125; 327/142, 327/143, 198; 365/226, 227, 229; 323/324; 710/1, 8, 10, 15; 713/320, 323
See application file for complete search history.

(56) References Cited
U.S. PATENT DOCUMENTS

| | | | |
|---|---|---|---|
| 6,523,128 B1 * | 2/2003 | Stapleton et al. ........... | 713/330 |
| 6,597,620 B1 * | 7/2003 | McMinn ...................... | 365/226 |
| 6,903,583 B1 * | 6/2005 | Habib et al. ................. | 327/143 |
| 2005/0093524 A1 * | 5/2005 | Hsu ............................ | 323/234 |

* cited by examiner

*Primary Examiner*—Bryan Bui
(74) *Attorney, Agent, or Firm*—Rabin & Berdo P.C.

(57) ABSTRACT

A method for verifying optimization of processor link. First, an initial bus width and an initial bus frequency of a bus coupled between a CPU and a Northbridge are set, such that the bus operates at the initial bus width and the initial bus frequency. Next, a read request for a Southbridge is generated. Next, a bus disconnection signal is output by the Southbridge to disconnect the CPU and the Northbridge when the Southbridge receives the read request. A timer is initialized for calculating an elapsed time value and an optimization verification signal at a first voltage level is generated. Next, a bus connection signal is output by the Southbridge when the elapsed time value reaches a predetermined value. Next, the voltage level of the optimization verification signal is transformed to a second voltage level. Finally, the CPU and the Northbridge are reconnected by the bus according to the bus connection signal, such that the bus operates at another bus operating bus width and another bus operating frequency.

22 Claims, 5 Drawing Sheets

US 7,082,385 B2

METHOD FOR VERIFYING OPTIMIZATION OF PROCESSOR LINK

BACKGROUND OF THE INVENTION

1. Field of the Invention

The present invention relates in general to a method for verifying optimization of processor link. In particular, the present invention relates to a method for verifying optimization of processor link by detecting a signal voltage level output from a Southbridge.

2. Description of the Related Art

Legacy I/O bus architectures are widely used in embedded systems because they are low cost and easily implemented using established software and hardware standards. These busses, however, top out at 66 MHz or so. Recently, processors operating at 500 MHz and 1 GHz and up clock frequencies need a faster alternative to these low bandwidth busses.

Lightning data transport (LDT) I/O bus, sometimes referred to hyper-transport (HT) I/O bus, delivers the high bus width needed for high performance applications in networking, communications and other embedded applications in a flexible, extensible and easily implemented bus structure. A scalable solution, the LDT I/O bus is capable of providing bus width for next generation processors and communications systems. A multivendor standard that is easily implemented, the LDT solution provides a broad selection of bus widths and speeds meeting the power, space and cost requirements of a wide range of embedded systems from low cost desktop workstations to digital consumer applications, communication systems, and networking equipment.

The optimization of LDT I/O bus is achieved through disconnection and reconnection of the LDT I/O bus enabling the LDT I/O bus to perform at desired bus width and operating frequency.

FIG. 1 is a schematic diagram of a conventional computer system comprising an LDT bus. As shown in the figure, LDT bus 12 is connected between CPU 10 and the Northbridge 14. Here, CPU 10 is an AMD K8 CPU, although the invention encompasses a wide range of CPU types, makes and models. Another bus 16 is connected between the Northbridge 14 and the Southbridge 18. LDT bus 12 connected between CPU 10 and the Northbridge 14 is disconnected and reconnected during power management of CPU and LDT bus optimization. The disconnection and reconnection of LDT bus 12 are performed according to the voltage level of the signal LDTSTOP# output by the Southbridge 18. The Southbridge 18 asserts the signal LDTSTOP# and outputs the asserted signal LDTSTOP#. The asserting of the signal LDTSTOP# transforms the voltage level of the signal LDTSTOP# from a normal level (high level as an example) to a low level.

LDT bus 12 is disconnected when both CPU 10 and the Northbridge 14 receive the asserted signal LDTSTOP#. Next, the timer 19 of the Southbridge 18 begins to calculate an elapsed time value. The Southbridge 18 de-asserts the signal LDTSTOP# when the elapsed time value of the timer 19 reaches a predetermined value. The de-asserting of the signal LDTSTOP# transforms the voltage level of the signal LDTSTOP# from the low level to the high level. LDT bus 12 is reconnected when both CPU 10 and the Northbridge 14 receive the de-asserted signal LDTSTOP#. Thus, LDT bus operates at another operating frequency and bus width.

FIG. 2 is a flowchart of the optimization of bus width and operating frequency of a conventional LDT I/O bus. First, LDT bus is initialized by basic input/output system (BIOS) (S1), such as by setting the optimized bus width and operating frequency of LDT bus connected between CPU and the Northbridge after booting. For example, the bus width of the LDT bus may be initialized as 8-bit, but can be changed to 16-bit after optimization. The operating frequency of the LDT bus may be initialized as 200 MHz, but can be changed to 400 MHz, 600 MHz or 800 MHz after optimization. Here, the optimized bus width and operating frequency of LDT bus is set by BIOS. Next, power management registers of CPU and the chipset comprising a Northbridge and a Southbridge are initialized by BIOS to set the related power setting (S2). Next, an auto-resume timer in the Southbridge is initialized for calculating an elapsed time value (S3). Next, BIOS issues a read request to a Southbridge power management I/O (PMIO) offset 15$h$ for asserting a signal LDTSTOP# (S4). Here, assertion of the signal LDTSTOP# transforms a high level signal LDTSTOP# to a low level signal LDTSTOP#. The LDT bus connected between CPU and the Northbridge is disconnected when the signal LDTSTOP# is asserted (S5).

Next, the Southbridge de-asserts the signal LDTSTOP# when the elapsed time value of the timer initialized in step S3 reaches a predetermined value (S6). Here, de-assertion of the signal LDTSTOP# transforms a low level signal LDTSTOP# to a high level signal LDTSTOP#. Thus, the LDT bus connected between CPU and the Northbridge is reconnected when the signal LDTSTOP# is de-asserted (S7). Therefore, the LDT bus operates at optimized bus width and operating frequency set in BIOS. Thus, optimization of bus width and operating frequency of LDT bus is completed.

The conventional LDT bus optimization described must disconnect and reconnect the LDT bus to change the bus width and operating frequency thereof. However, the bus width and operating frequency of LDT bus are not changed when the disconnection and reconnection processes of the LDT bus perform unsuccessfully. Thus, the bus optimization fails and performance is poor.

However, the disconnection and reconnection processes of the LDT bus may never occur due to an inaccurate register setting by system BIOS. It is thus difficult to detect completion of the asserted and de-asserted signal LDTSTOP# sequences. It is inconvenient to debug the system if the signal LDTSTOP# pin must be probed by oscilloscope every time. Moreover, even when asserted and de-asserted signals LDTSTOP# are detected, broken circuits at the connection between the Southbridge 18 and CPU 10 or the Northbridge 14 can cause bus optimization to failed.

SUMMARY OF THE INVENTION

The object of the present invention is thus to provide a method for verifying optimization of processor link to ensure assertion and de-assertion of signal LDTSTOP# are complete. Poor performance resulting from unsuccessful optimization of processor link is thus prevented.

To achieve the above-mentioned object, the present invention provides a method for verifying optimization of processor link. First, an initial bus width and an initial bus frequency of the bus coupled between a CPU and a Northbridge are set, such that the bus operates at the initial bus width and the initial bus frequency. Next, a read request for a Southbridge is generated. Next, a bus disconnection signal is output by the Southbridge to disconnect the CPU and the Northbridge when the Southbridge receives the read request. A timer is initialized for calculating an elapsed time value and an optimization verification signal with a first voltage level is generated. Next, a bus connection signal is output by the Southbridge when the elapsed time value reaches a predetermined value. Next, the voltage level of the optimization verification signal transforms to a second voltage level. Finally, the CPU and the Northbridge are reconnected by the bus according to the bus connection signal, such that the bus operates at another bus operating bus width and another bus operating frequency.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
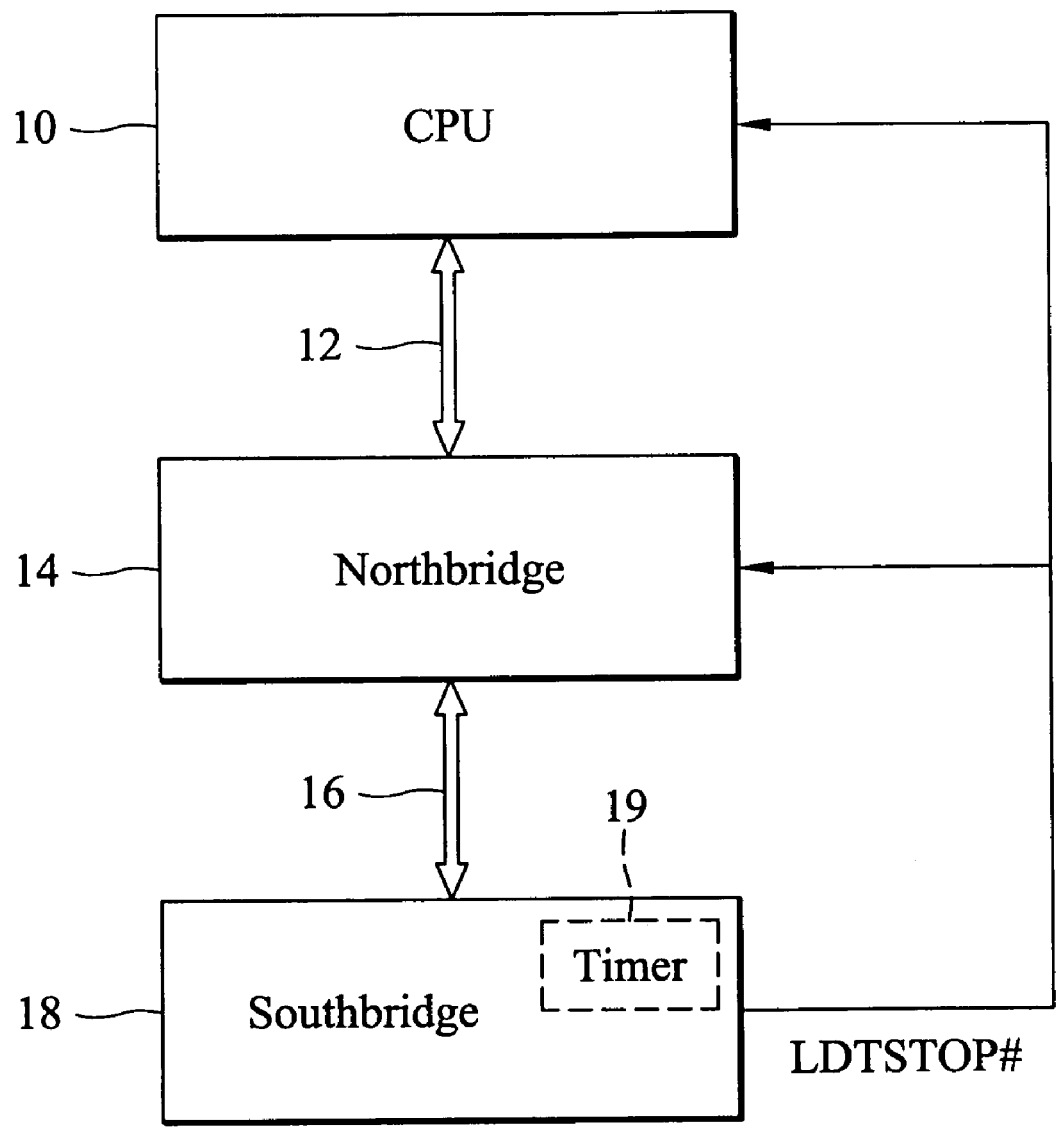
FIG. 1 is a flowchart of the optimization of bus width and operating frequency of a conventional LDT I/O bus.
Figure 2:
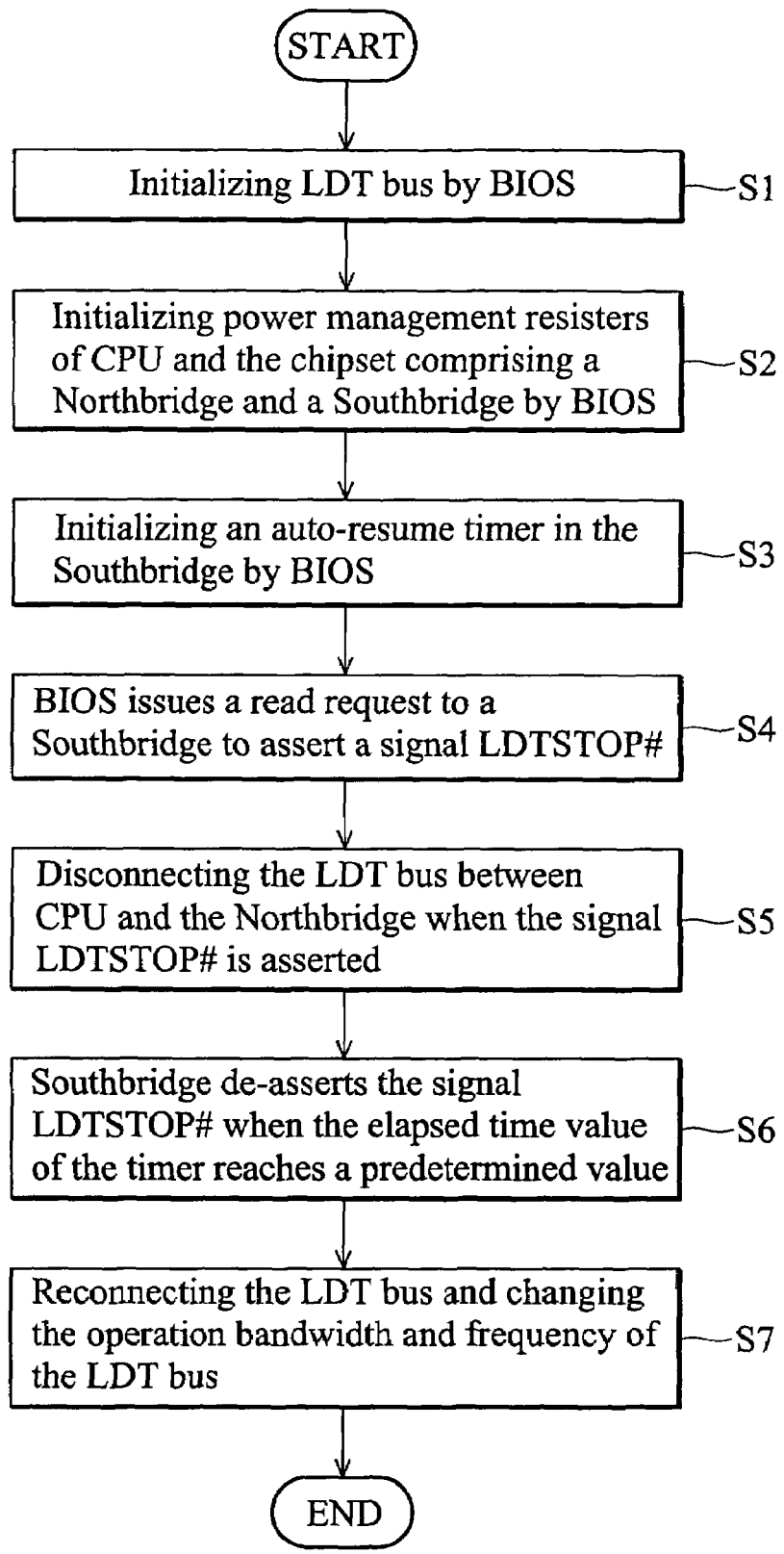
FIG. 2 is a flowchart of the optimization of bus width and operating frequency of a conventional LDT I/O bus.
Figure 3:
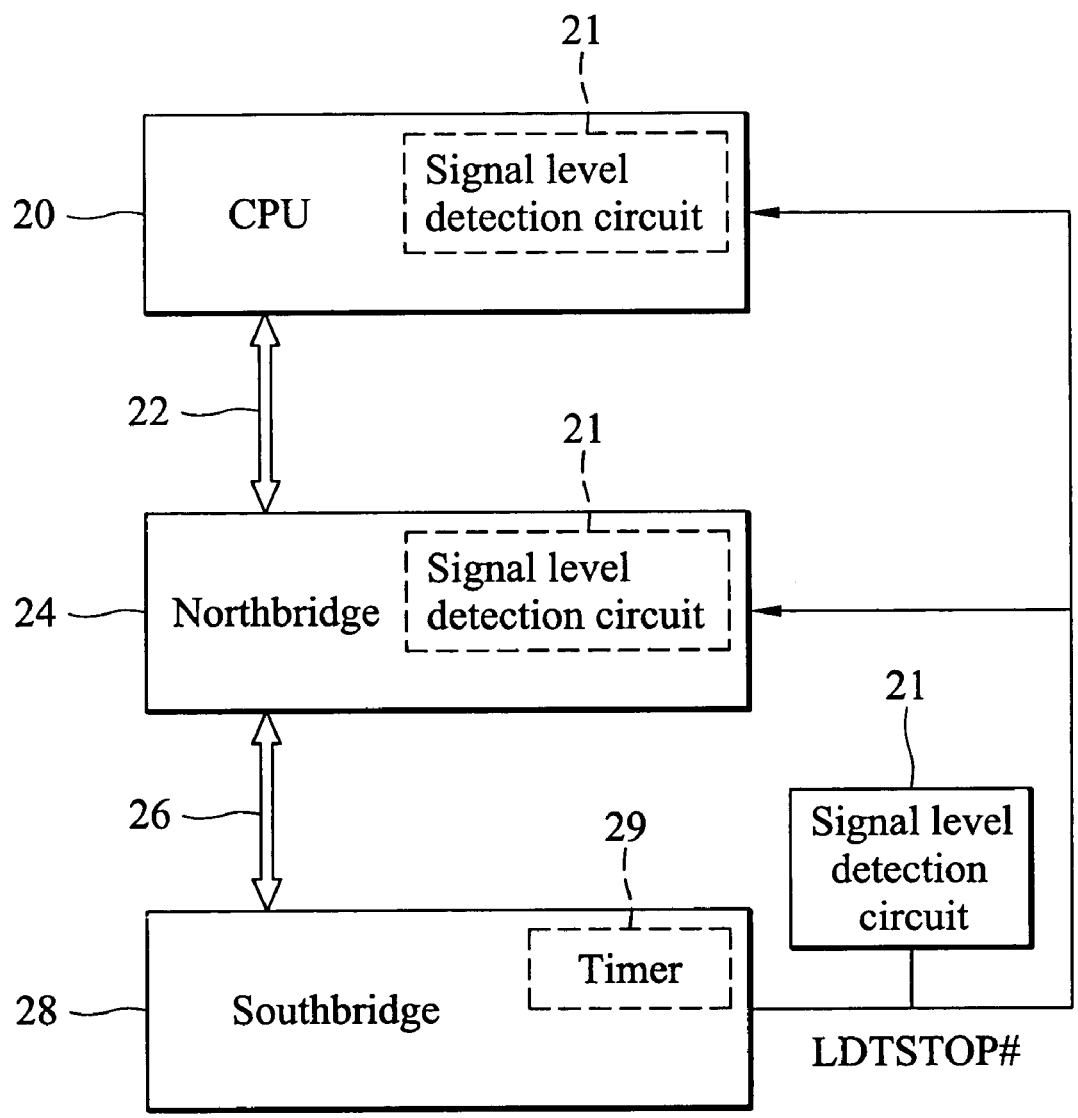
FIG. 3 is a schematic diagram of computer system comprising a LDT bus according to the present invention.

FIG. 3 is a schematic diagram of computer system comprising a LDT bus according to the present invention. As shown in the figure, LDT bus 22 (or hyper-transport (HT) bus) is connected between CPU 20 and the Northbridge 24. Here, CPU 20 is an AMD K8 CPU, although the invention encompasses a wide range of CPU types, makes and models. Another bus 26 is connected between the Northbridge 24 and the Southbridge 28. LDT bus 22 connected between CPU 20 and the Northbridge 24 is disconnected and reconnected during bus optimization. The disconnection and reconnection of LDT bus 22 are performed according to the voltage level of the signal LDTSTOP# output by the Southbridge 28. The Southbridge 28 asserts the signal LDTSTOP# and outputs the asserted signal LDTSTOP#. LDT bus 22 is disconnected when both CPU 20 and the Northbridge 24 receive the asserted signal LDTSTOP#. Next, the timer 29 of the Southbridge 28 begins to calculate an elapsed time value. The Southbridge 28 de-asserts the signal LDTSTOP# when the elapsed time value of the timer 29 reaches a predetermined value. LDT bus 22 is reconnected when both CPU 20 and the Northbridge 24 receive the de-asserted signal LDTSTOP#. Thus, LDT bus operates at another operating frequency and bus width.

In addition, the present invention adds a signal level detection circuit 21 to detect the asserting and de-asserting of the signal LDTSTOP#.

Figure 4:
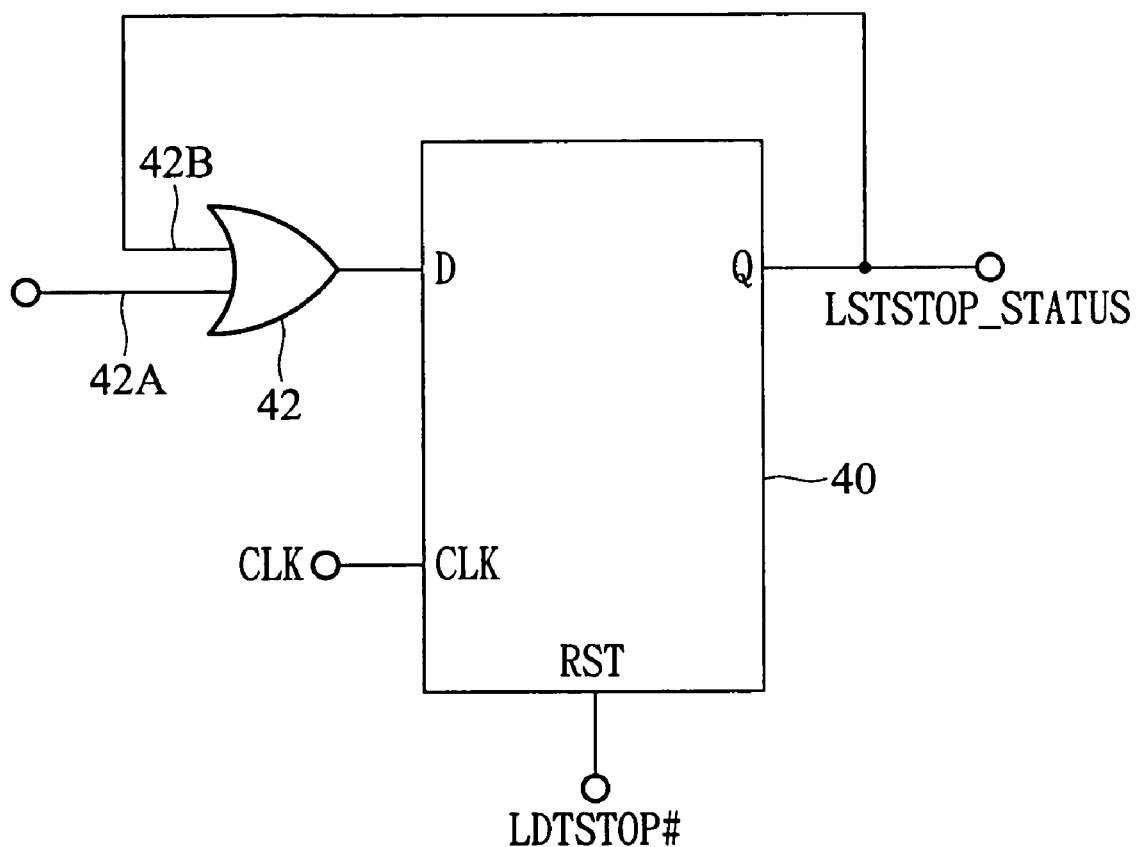
FIG. 4 is a circuit diagram of the signal level detection circuit 21 according to the present invention.

FIG. 4 is a circuit diagram of the signal level detection circuit 21 according to the present invention. The signal level detection circuit 21 comprises a flip-flop 40 and an OR logic gate 42 connected to the terminal D of the flip-flop 40. The input terminal 42A of the OR logic gate 42 receives a logic level "1" signal output by system. Thus, the terminal Q of the flip-flop 40 outputs a signal LDTSTOP_STATUS with logic level "1". The signal LDTSTOP_STATUS output by the terminal Q of the flip-flop 40 is reset to "0" when the voltage level of the signal LDTSTOP# received by the terminal RST of the flip-flop 40 becomes a low voltage level.

The level of the signal LDTSTOP# is high in its normal state. The logic level of the signal LDTSTOP_STATUS output by the terminal Q of the flip-flop 40 is low "0" after assertion and de-assertion of the signal LDTSTOP# in sequence. Thus, the asserted and de-asserted process of the signal LDTSTOP# is detected.

As shown in FIG. 3, the signal level detection circuit 21 can be located at the output of the Southbridge 20 and the inputs of the CPU 20 and the Northbridge 24 to receive the signals LDTSTOP#. In addition, the circuit diagram shown in FIG. 4 is only a preferred embodiment in the present invention. The level detection of the signal LDTSTOP_STATUS can be performed by other circuits.

Figure 5:
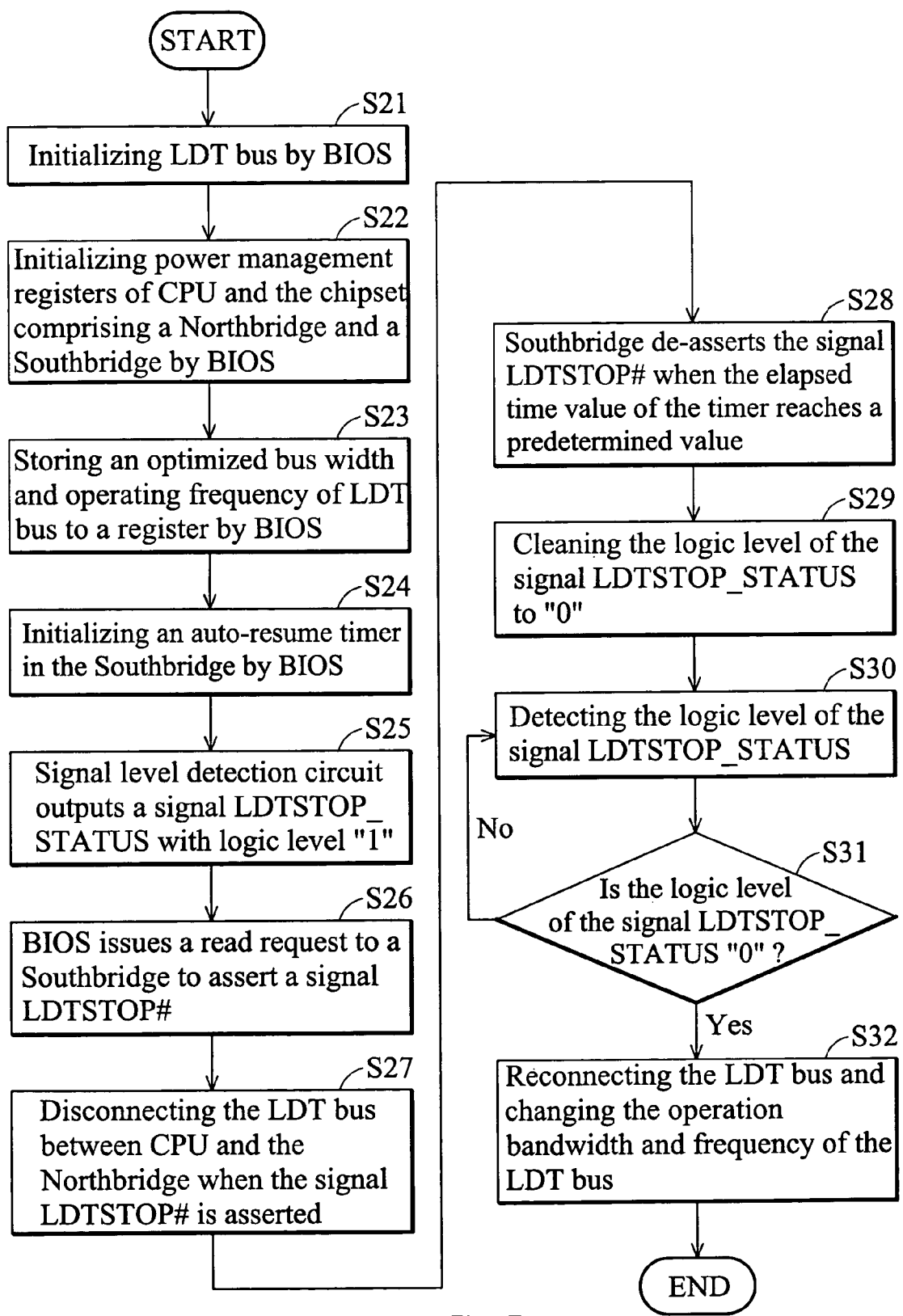
FIG. 5 is a flowchart of verifying optimization of the LDT bus according to the present invention.

FIG. 5 is a flowchart of verifying optimization of the LDT bus according to the present invention. First, LDT bus is initialized by basic input/output system (BIOS) (S21), such as by setting the optimized bus width and operating frequency of LDT bus connected between CPU and the Northbridge after booting. For example, the bus width of the LDT bus may be initialized as 8-bit, but can be changed to 16-bit after optimization. The operating frequency of the LDT bus may be initialized as 200 MHz, but can be changed to 400 MHz, 600 MHz or 800 MHz after optimization. Here, the optimized bus width and operating frequency of LDT bus are set by BIOS.

Next, power management registers of CPU and the chipset comprising a Northbridge and a Southbridge are initialized by BIOS to set the related power setting (S22). The optimized bus width and operating frequency of LDT bus are stored to a register by BIOS (S23). For, example, the optimized bus width of LDT bus is set as 16-bit, and the optimized frequency is set as 800 MHz. Next, an auto-resume timer in the Southbridge is initialized for calculating an elapsed time value (S24).

Next, a signal with a logic level "1" is input to the input terminal 42A of the OR logic gate 42 in the signal level detection circuit 21, thus the terminal Q of the flip-flop 40 outputs a signal LDTSTOP_STATUS with logic level "1" (S25). Next, BIOS issues a read request to a Southbridge power management I/O (PMIO) offset 15h for asserting a signal LDTSTOP# (S26). Here, the assertion of the signal LDTSTOP# transforms a high level signal LDTSTOP# to a low level signal LDTSTOP#. The LDT bus connected between CPU and the Northbridge is disconnected when the signal LDTSTOP# is asserted (S27).

Next, the Southbridge de-asserts the signal LDTSTOP# when the elapsed time value of the timer initialized in step S24 reaches a predetermined value (S28). Here, the de-assertion of the signal LDTSTOP# transforms a low level signal LDTSTOP# to a high level signal LDTSTOP#. When the signal LDTSTOP# is asserted to low voltage level, the logic level of the signal LDTSTOP_STATUS output from the terminal Q of the flip-flop 40 is cleaned to "0" (S29) because the terminal RST of the signal level detection circuit 21 receives the low level signal LDTSTOP#.

Next, the voltage level of the signal LDTSTOP_STATUS output from the terminal Q of the flip-flop 40 is detected to determine that assertion and de-assertion of the signal LDTSTOP# is completed (S30). The CPU determines whether the voltage level of the signal LDTSTOP_STATUS is "0" (S31). If not, the process returns to step S30 to detect the voltage level of the signal LDTSTOP_STATUS. If so, the LDT bus connected between CPU and the Northbridge is reconnected (S32). Thus, the LDT bus operates at the optimized bus width and operating frequency set in BIOS.

According to the method for verifying optimization of processor link according to the embodiment of the present invention, the assertion and de-assertion of the signal LDTSTOP# is detected according to the voltage level of the signal LDTSTOP_STATUS detected by the signal level detection circuit 21 in the Southbridge. In addition, the signal LDTSTOP# provided to the Northbridge and CPU is confirmed by adding the signal level detection circuit 21 to the input of the Northbridge and CPU. Thus, the disconnection and reconnection of the bus link between the Northbridge and CPU is verified.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for verifying optimization of processor link for a system comprising a Northbridge, a bus coupled between a CPU and the Northbridge, and a Southbridge, the method comprising the following steps:

setting an initial bus width and an initial bus frequency of the bus coupled between the CPU and the Northbridge, wherein the bus operates at the initial bus width and the initial bus frequency;

generating a read request to read the Southbridge;

outputting a bus disconnection signal by the Southbridge to disconnect the CPU and the Northbridge when the Southbridge receives the read request, initializing a timer for calculating an elapsed time value and outputting an optimization verification signal with a first voltage level;

outputting a bus connection signal by the Southbridge when the elapsed time value reaches a predetermined value;

transforming the voltage level of the optimization verification signal to a second voltage level according to the bus connection signal; and reconnection of the CPU and the Northbridge by the bus according to the optimization verification signal with the logic level transformed to the second voltage level, wherein the bus operates thereafter at another bus operating bus width and another bus operating frequency.

2. The method for verifying optimization of processor link as claimed in claim 1, wherein the bus is a lightning data transport bus.

3. The method for verifying optimization of processor link as claimed in claim 1, wherein the bus is a hyper-transport bus.

4. The method for verifying optimization of processor link as claimed in claim 1, further comprising the step of setting an optimized bus operating bus width and an optimized bus operating frequency of the bus.

5. The method for verifying optimization of processor link as claimed in claim 4, wherein the bus operates at the optimized bus operating bus width and the optimized bus operating frequency when the CPU and the Northbridge are reconnected.

6. The method for verifying optimization of processor link as claimed in claim 1, wherein the bus disconnection signal and the bus connection signal are output by a single output terminal of the Southbridge.

7. The method for verifying optimization of processor link as claimed in claim 1, wherein the bus disconnection signal and the bus connection signal are generated by asserting and de-asserting a signal output by the Southbridge.

8. The method for verifying optimization of processor link as claimed in claim 1, wherein the optimization verification signal is output by a signal level detection circuit.

9. The method for verifying optimization of processor link as claimed in claim 8, wherein the signal level detection circuit comprises a flip-flop and an OR logic gate coupled to the flip-flop, the flip-flop outputs the optimization verification signal with the first voltage level when the Southbridge outputs the bus disconnection signal, and outputs the optimization verification signal with the second voltage level when the Southbridge outputs the bus connection signal.

10. The method for verifying optimization of processor link as claimed in claim 8, wherein the signal level detection circuit is coupled to the output terminal of the Southbridge.

11. The method for verifying optimization of processor link as claimed in claim 8, wherein the signal level detection circuit is coupled to the input terminals of the CPU or the Northbridge.

12. The method for verifying optimization of processor link as claimed in claim 9, wherein the flip-flop comprises a terminal coupled to the Southbridge.

13. A method for verifying optimization of processor link for a system comprising a Northbridge, a bus coupled between the CPU and the Northbridge, and a Southbridge, the method comprising the following steps:

setting an initial bus width, an initial bus frequency, a bus operating bus width and a bus operating frequency of the bus coupled between the CPU and the Northbridge, wherein the bus operates at the initial bus width and the initial bus frequency;

setting an optimized bus operating bus width and an optimized bus operating frequency of the bus;

generating a read request to read the Southbridge;

outputting a bus disconnection signal by the Southbridge to disconnect the CPU and the Northbridge when the Southbridge receiving the read request, initializing a timer for calculating an elapsed time value and outputting an optimization verification signal with a first voltage level;

outputting a bus connection signal by the Southbridge when the elapsed time value reaches a predetermined value;

transforming the voltage level of the optimization verification signal to a second voltage level according to the bus connection signal; and reconnection of the CPU and the Northbridge by the bus according to the optimization verification signal with the logic level transformed to the second voltage level, wherein the bus operates thereafter at the optimized bus operating bus width and the optimized bus operating frequency.

14. The method for verifying optimization of processor link as claimed in claim 13, wherein the bus is a lightning data transport bus.

15. The method for verifying optimization of processor link as claimed in claim 13, wherein the bus is a hyper-transport bus.

16. The method for verifying optimization of processor link as claimed in claim 13, wherein the bus disconnection signal and the bus connection signal are output by a single output terminal of the Southbridge.

17. The method for verifying optimization of processor link as claimed in claim 13, wherein the bus disconnection signal and the bus connection signal are generated by asserting and de-asserting a signal output by the Southbridge.

18. The method for verifying optimization of processor link as claimed in claim 13, wherein the optimization verification signal is output by a signal level detection circuit.

19. The method for verifying optimization of processor link as claimed in claim 18, wherein the signal level detection circuit comprises a flip-flop and an OR logic gate coupled to the flip-flop, the flip-flop outputs the optimization verification signal with the first voltage level when the Southbridge outputs the bus disconnection signal, and outputs the optimization verification signal with the second voltage level when the Southbridge outputs the bus connection signal.

20. The method for verifying optimization of processor link as claimed in claim 18, wherein the signal level detection circuit is coupled to the output terminal of the Southbridge.

21. The method for verifying optimization of processor link as claimed in claim 18, wherein the signal level detection circuit is coupled to the input terminals of the CPU or the Northbridge.

22. The method for verifying optimization of processor link as claimed in claim 19, wherein the flip-flop comprises a terminal coupled to the Southbridge.

* * * * *